(12) United States Patent
Hanson et al.

(10) Patent No.: US 8,240,180 B2
(45) Date of Patent: Aug. 14, 2012

(54) HEIGHT POSITIONING MECHANISM FOR ROLL STAND ASSEMBLY ON AN APPARATUS FOR CONTINUOUSLY FORMING AN EXTRUDED SHEET PRODUCT

(75) Inventors: Dana R. Hanson, St. Charles, IL (US); Mitchell L. Gritzner, Montgomery, IL (US); Ryan E. Leopold, Sycamore, IL (US)

(73) Assignee: Processing Technologies, LLC, Aurora, IL (US)

( * ) Notice: Subject to any disclaimer, the term of this patent is extended or adjusted under 35 U.S.C. 154(b) by 611 days.

(21) Appl. No.: 12/455,353

(22) Filed: Jun. 1, 2009

(65) Prior Publication Data

US 2010/0300171 A1 Dec. 2, 2010

(51) Int. Cl.
 *B21B 29/00* (2006.01)
 *B21B 31/07* (2006.01)
 *B21C 47/06* (2006.01)
(52) U.S. Cl. .......................... 72/241.6; 72/245
(58) Field of Classification Search .................... 72/201, 72/241.6, 244, 245
See application file for complete search history.

(56) References Cited

U.S. PATENT DOCUMENTS

| | | | | |
|---|---|---|---|---|
| 3,369,383 A * | 2/1968 | Barnikel | | 72/244 |
| 4,041,752 A * | 8/1977 | Dolenc et al. | | 72/201 |
| 4,759,485 A * | 7/1988 | Braun et al. | | 72/245 |
| 4,936,207 A * | 6/1990 | Niskanen et al. | | 72/241.6 |
| 5,765,424 A * | 6/1998 | Mantovan | | 72/245 |

* cited by examiner

*Primary Examiner* — David B Jones
(74) *Attorney, Agent, or Firm* — Wood, Phillips, Katz, Clark & Mortimer

(57) ABSTRACT

An apparatus for continuously forming an extruded sheet product having an extruder assembly with a sheet die for delivering flowable material. A roll stand assembly has a main frame with first and second rolls. A vertical height positioning mechanism is operated to vary the relationship between the sheet die and nip location between rolls and has first and second lift components that cooperate with the main frame at first and second laterally spaced locations. The first and second lift components are each movable in first and second opposite paths to selectively elevate and lower the nip location relative to the sheet die. The vertical height positioning mechanism further has an actuating system to selectively and simultaneously cause the first and second lift components to move.

18 Claims, 16 Drawing Sheets

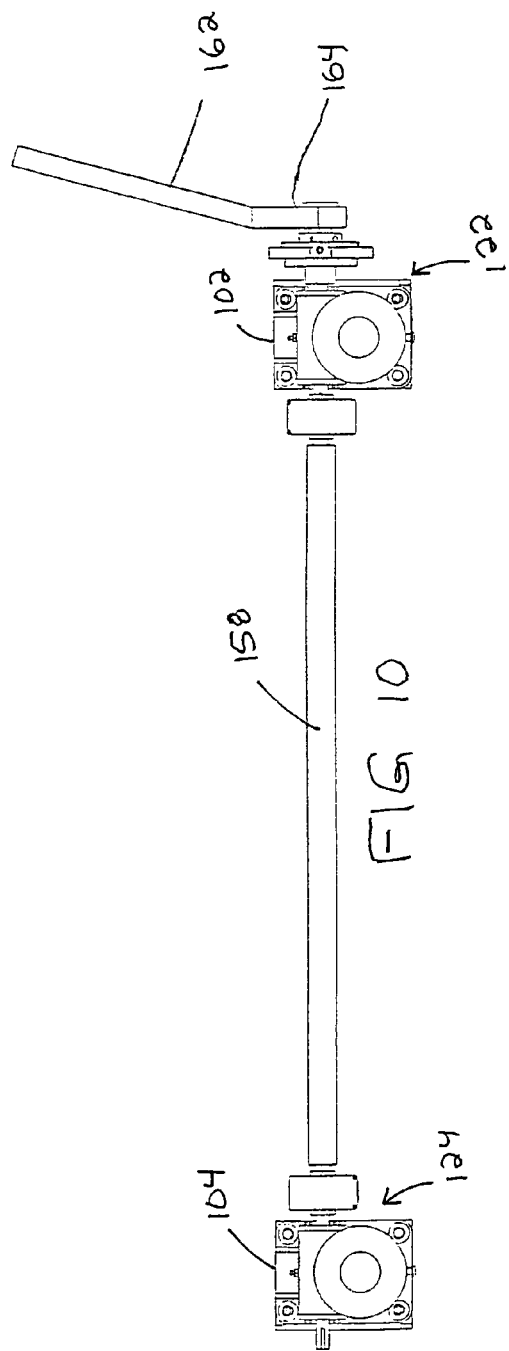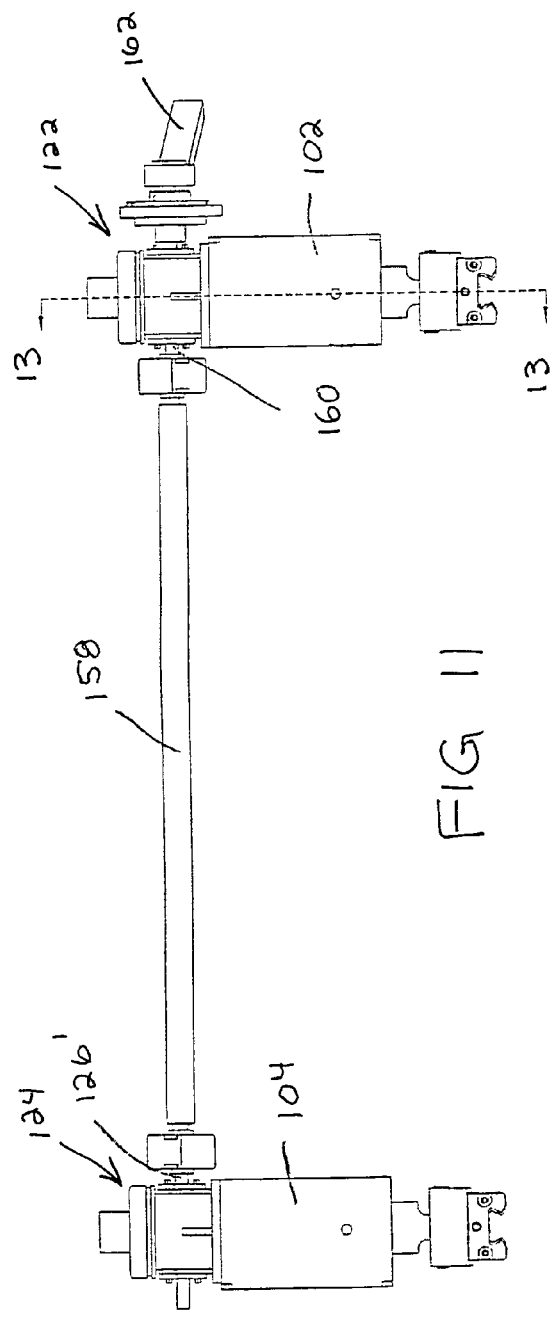

HEIGHT POSITIONING MECHANISM FOR ROLL STAND ASSEMBLY ON AN APPARATUS FOR CONTINUOUSLY FORMING AN EXTRUDED SHEET PRODUCT

BACKGROUND OF THE INVENTION

1. Field of the Invention

This invention relates to extruded sheets and, more particularly, to an apparatus for continuously forming a sheet product using a roll stand assembly with cooperating rolls defining a nip location at which flowable material is continuously delivered from a sheet die during the sheet product formation process.

2. Background Art

Extruded sheets are formed from many different materials, with many different thicknesses, and with different layer constructions. An extruded sheet may be formed by itself or combined with one or more other sheet layers that are concurrently formed, or combined after formation.

In a typical apparatus for extrusion forming sheet products, a roll stand assembly is placed downstream of an extruder assembly with an associated sheet die. Flowable material is delivered to the sheet die to a nip/lamination location between adjacent rolls on the roll stand assembly. The applied material is advanced through a gap between the adjacent rolls defined at the nip location from where it may be routed between one or more additional roll pairs before it arrives at a downstream accumulation location at which a final sheet product may be rolled, stacked, packaged, staged, or otherwise handled or processed.

In this type of apparatus, the relative vertical positions of the sheet die and nip location are varied, dependent upon the nature of the flowable material and the thickness applied at the nip location. This relationship is typically controlled by changing the height of the upstream end of the roll stand assembly. Heretofore, the vertical movement of the end of the roll stand assembly has been effected either manually or through mechanisms that are power driven.

Manual repositioning of the upstream end of the roll stand assembly is typically carried out by changing the relationship between laterally spaced supporting casters and a main frame on the roll stand assembly. A plurality of such casters is incorporated to guide movement of the roll stand assembly in a horizontal path selectively towards and away from the sheet die. The mounting mechanisms for the casters at the upstream end of the roll stand assembly are designed to be reconfigured through manual turning of one or more threaded components to selectively raise and lower the upstream end of the roll stand assembly.

The manual systems have a number of drawbacks. First of all, a separate tool is required to be kept on hand to make the necessary adjustments. This is an inconvenience in itself. In the event that the required tools are not immediately on hand, there may be delays experienced in effecting the necessary adjustments.

Components that are operated with conventional tools, such as wrenches and screwdrivers, are prone to being worn and stripped. This problem is aggravated by providing the adjusting elements within protective housings where they are not exposed for ready access, as a result of which the tools may not be properly aligned as the requisite movement of the adjusting elements is effected/attempted.

Such adjusting elements are relatively small and typically made from metal that is prone to becoming compromised by rust and corrosion caused by exposure to moisture and/or chemicals present in the working environment. This could cause these elements to seize, which may necessitate corrective actions that are time consuming and inconvenient.

Further, the roll stand assemblies are generally heavy components. To effect elevation of the upstream end of the roll stand assembly, a force imparted to the mechanism associated with the caster is resisted by the substantial weight of the roll stand assembly. This could also lead to stripping of the adjusting elements.

A still further problem with mechanical systems is that they are separately provided at each lateral side of a main frame on the roll stand assembly. An operator is therefore required to move from one side to the other to assure that the upstream end of the roll stand is level and elevated, or lowered, to the appropriate height. If gross changes are made on one side of the main frame, the entire roll stand assembly may skew. This condition may not be completely remedied, as a result of which the roll stand assembly may not be properly aligned with the other system components, and particularly the sheet die. This may lead to a compromise in the sheet product that is formed using the roll stand assembly.

Still further, operators have been required to either manually measure or eye the vertical relationship between the sheet die and nip location during this process. This is inherently inconvenient and may lead to imprecise vertical adjustment between the nip location and sheet die. This also adds significantly to the set-up time for the system as the user progressively moves the upstream end of the roll stand assembly in a vertical direction and attempts to achieve a precise relationship and maintain full level between the sides of the main frame.

Powered systems overcome some of the above problems but introduce others. Powered systems are inherently expensive, particularly given the heavy nature of this type of equipment.

Additionally, powered systems are relatively complex in nature and prone to failure. In the event that the vertical repositioning structure is for some reason not operating as required, the entire system into which the roll stand assembly is incorporated may be down while repairs are made. This can have a significant financial impact.

While the above apparatus have a number of drawbacks, the industry has continued to use them because it was lacking any substitute structure that addresses all of the issues relating to cost, convenience, reliability, and accuracy.

SUMMARY OF THE INVENTION

In one form of the invention, an apparatus is provided for continuously forming an extruded sheet product. The apparatus has an extruder assembly with a sheet die, through which flowable material is delivered for sheet product formation, and a roll stand assembly with a main frame and a plurality of rolls on the main frame that cause flowable material from the sheet die to be formed into a sheet layer that makes up a sheet product. The roll stand assembly has upstream and downstream ends and laterally spaced sides. The plurality of rolls includes first and second rolls between which a nip location is defined at which flowable material is delivered by the sheet die. A vertical height positioning mechanism is provided through which a vertical relationship between the sheet die and nip location can be selectively varied. The vertical height positioning mechanism includes first and second lift components that cooperate with the main frame at first and second laterally spaced locations. The first and second lift components are each movable in first and second opposite paths relative to a subjacent support for the apparatus in: a) a first direction to reposition the main frame in a first manner through force application at the first and second locations to elevate the nip location relative to the sheet die; and b) a second direction to cause the main frame to reposition in a second manner to lower the nip location relative to the sheet die. The vertical height positioning mechanism further includes an actuating system that is operable to selectively and simultaneously cause the first and second lift components to move in the first direction.

In one form, the actuating system is operable to selectively and simultaneously cause the first and second lift components to move in the second direction.

In one form, the first and second opposite paths for the first and second components are substantially vertical paths.

In one form, the actuating system has first and second actuator sub-assemblies, associated respectively with the first and second lift components, and a main input actuator having a graspable handle that is repositionable in a predetermined manner to cause the actuator sub-assemblies to cause the first and second lift components to move.

In one form, the graspable handle remains inseparably a part of the roll stand assembly.

In one form, the graspable handle is movable in the predetermined manner around an operating axis.

In one form, the main input actuator has first and second states. With the main input actuator in the first state, the graspable handle is movable back and forth in opposite directions around the operating axis to cause the lift components to move in their first direction, as an incident of which the main frame is repositioned to elevate the nip location relative to the sheet die. With the main input actuator in the second state, the graspable handle is movable back and forth in opposite directions around the operating axis to cause the lift components to move in their second direction, as an incident of which the main frame is repositioned so as to lower the nip location relative to the sheet die.

In one form, the first and second actuator sub-assemblies are linked to each other to operate simultaneously.

In one form, the first and second actuator sub-assemblies include first and second input shafts that are turned selectively oppositely around first and second axes and the first and second actuator sub-assemblies are linked so that movement of the first input shaft around the first axis causes a corresponding movement of the second shaft around the second axis.

In one form, the apparatus further includes a sub-frame assembly. The main frame has a plurality of shoes, including first and second shoes, that cooperate with the sub-frame assembly to allow the main frame to be guidingly moved relative to the extruder assembly and sheet die on the extruder assembly. The first and second actuator sub-assemblies are respectively mounted on the first and second shoes.

In one form, the first and second actuator sub-assemblies are connected to the first and second shoes through first and second pins that allow limited pivoting movement respectively between the first and second actuator sub-assemblies and first and second shoes.

In one form, the graspable handle has an elongate portion that can be grasped by a hand of a user and moved in the predetermined manner by the user through the grasping hand.

In one form, the apparatus has upstream and downstream ends and the elongate handle portion has a length that is alignable to extend generally between the upstream and downstream ends of the apparatus.

In one form, the operating axis extends substantially horizontally.

In one form, the first and second lift components each includes a housing that is fixed to the main frame and the first and second sub-assemblies include first and second vertically extending shaft assemblies relative to which the first and second housings are respectively guidingly moved in the first and second directions.

In one form, the actuating system includes first and second actuator sub-assemblies each having first and second gears that interact on each actuator sub-assembly. The gears are turned relative to each other to effect guided movement of each housing relative to a respective shaft assembly.

In one form, the main frame includes laterally spaced side walls between which the plurality of rolls is mounted and the housings are fixed, one each, to the main frame side walls.

In one form, the apparatus further includes an indicator assembly that provides a visually detectable indication of different orientations of the roll stand assembly as changed through the vertical height positioning mechanism.

Another form of the invention is directed to a method of changing a vertical relationship between a sheet die on an extruder assembly and a nip location between adjacent rolls mounted on a main frame on a roll stand assembly at which flowable material is delivered through the sheet die during continuous formation of an extruded sheet product. The method includes the steps of providing a vertical height positioning mechanism and through that height positioning mechanism simultaneously applying forces at spaced locations on the main frame through manual operation of an actuator to reposition the main frame so as to thereby controllably change a vertical relationship between the nip location and the sheet die.

In one form, the step of simultaneously applying forces includes hand grasping and manipulating a handle on the actuator, which handle is retained as part of the roll stand assembly, by grasping and moving the handle in a predetermined manner.

BRIEF DESCRIPTION OF THE DRAWINGS

FIG. 10 is an enlarged, plan view of the vertical height positioning mechanism in FIG. 9;

FIG. 11 is an enlarged, elevation view of the vertical height positioning mechanism from an upstream perspective;

DETAILED DESCRIPTION OF THE PREFERRED EMBODIMENT

Figure 1:
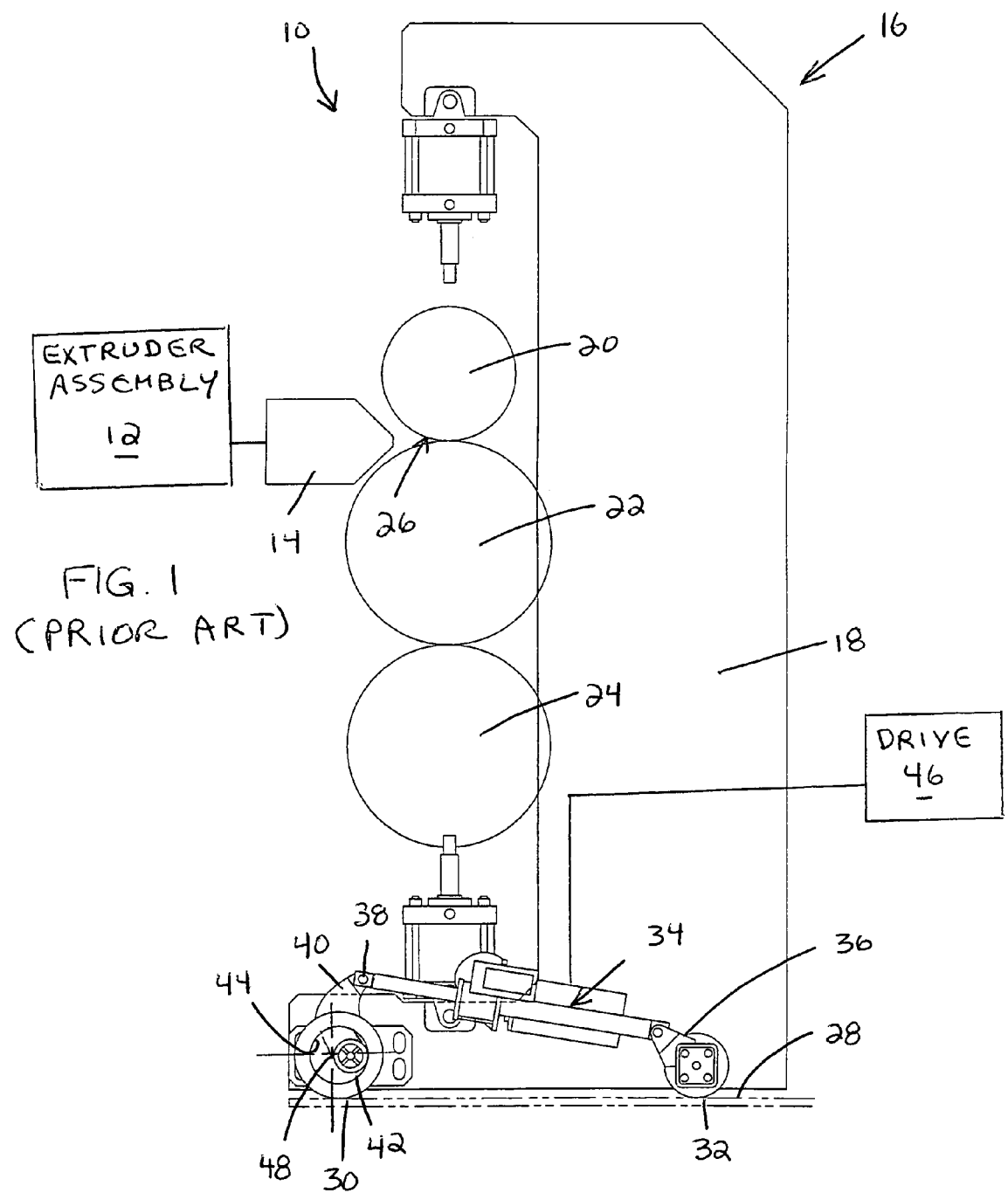
FIG. 1 is a partially schematic, side elevation view of a conventional apparatus for forming an extruded sheet product and consisting of an extruder assembly with a sheet die and a roll stand assembly with a mechanism for selectively raising and lowering the upstream end of the roll stand assembly relative to the sheet die, and with the roll stand assembly in a neutral position.
Figure 2:
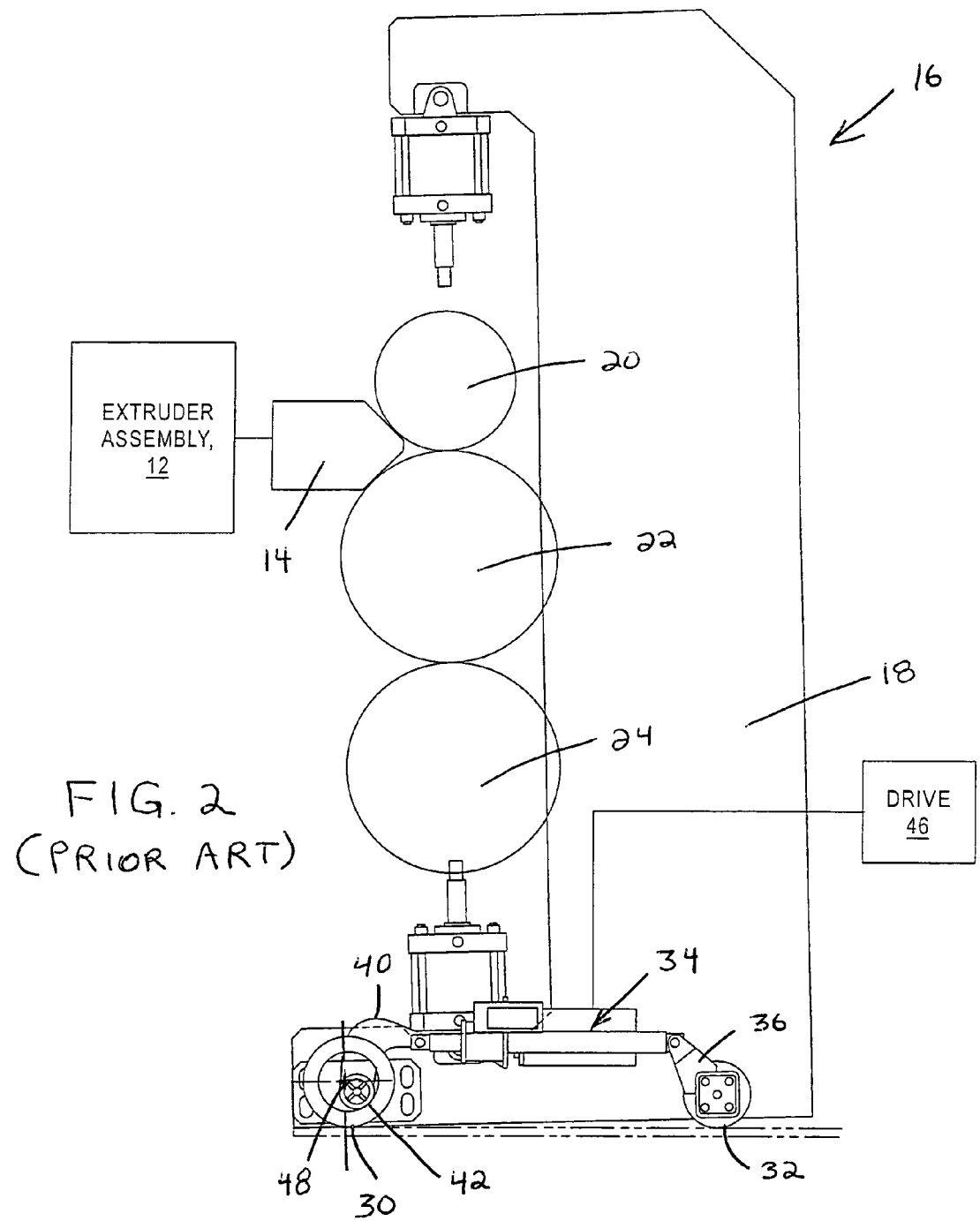
FIG. 2 is a view as in FIG. 1 wherein the mechanism is operated to lower the upstream end of the roll stand assembly from the neutral position of FIG. 1.
Figure 3:
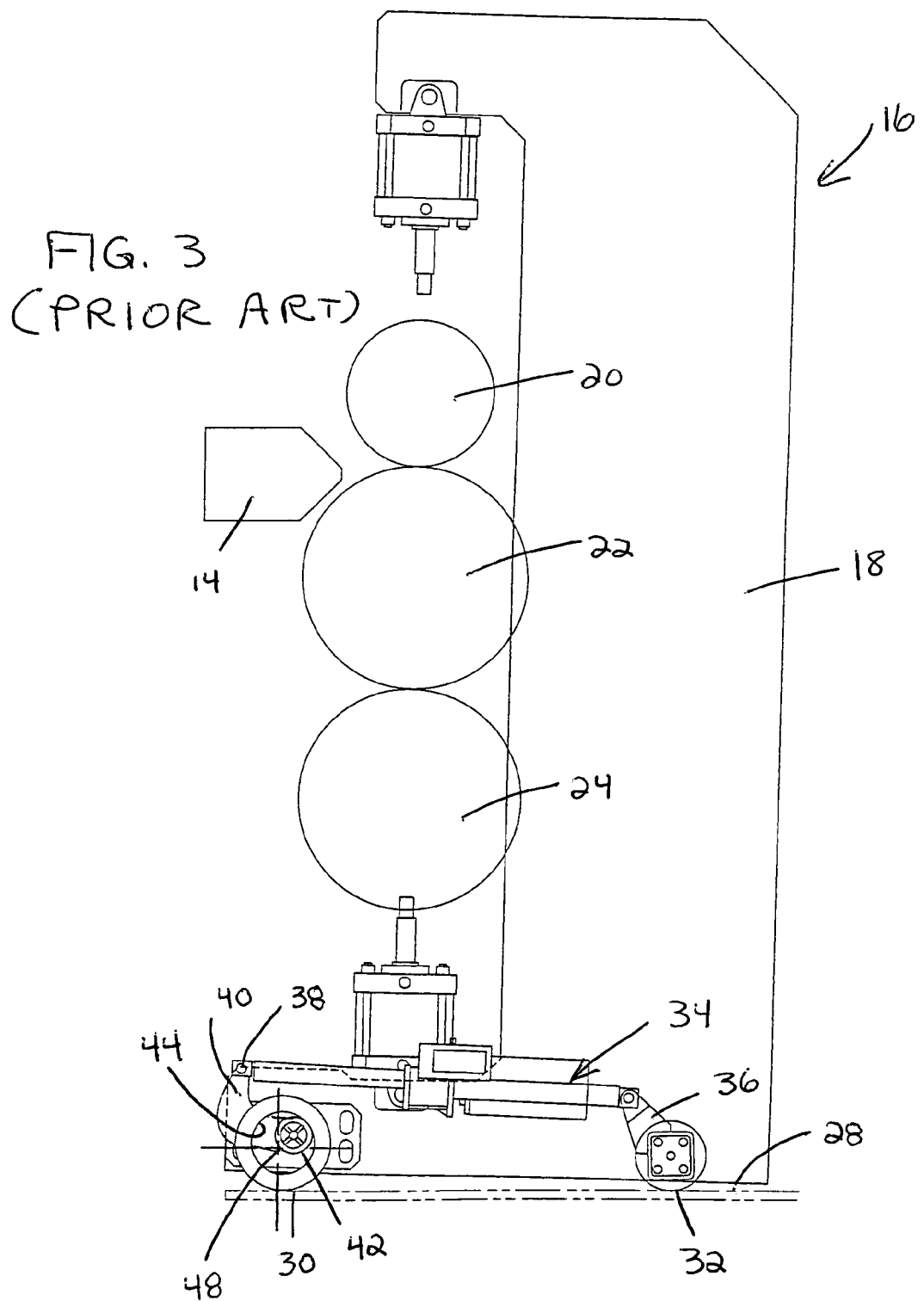
FIG. 3 is a view as in FIG. 1 wherein the mechanism is operated to raise the upstream end of the roll stand assembly from the neutral position of FIG. 1.

In FIGS. 1-3, a conventional apparatus is shown at 10 for continuously forming an extruded sheet product. The apparatus 10 consists of an extruder assembly 12, with an associated sheet die 14, and a roll stand assembly 16. The roll stand assembly 16 consists of a main frame 18 that supports a plurality of rolls 20, 22, 24. The rolls 20, 22 cooperate and define a nip/lamination location 26 therebetween at which the sheet die 14 continuously delivers a flowable material over substantially the entire widthwise extent of the rolls 20, 22.

The main frame 18 is supported on a pair of laterally spaced rails 28 (one shown). Upstream and downstream casters 30, 32, respectively, cooperate with each rail 28 and allow the roll stand assembly 16 to be translated selectively towards and away from the sheet die 14 along the path dictated by the rails 28.

Each caster pair 30, 32 is joined by an extendible cylinder 34, with one cylinder end pivotably attached to a bracket 36 associated with the caster 32. An end of an extendable rod 38 is similarly pivotably connected to a bracket 40 associated with the caster 30.

The bracket 40 has an associated drive component 42 that is eccentrically located within a guide tube 44. With the extendable cylinder 34 in a neutral position, as shown in FIG. 1, a drive 46 for the extendable cylinder 34 is operated to either extend or retract the rod 38. By extending the rod 38, the effective length of the cylinder 34 is increased, whereby the bracket 40 and guide tube 44 are pivoted in a clockwise direction around the axis 48. As this occurs, the drive component 42 exerts a vertical force upon the inside of the guide tube 44 that causes the upstream end of the main frame 18, to which the guide tube 44 is fixed, to elevate to the FIG. 3 position. The drive component 42 progressively cams the guide tube 44, and thus the upstream end of the main frame 18, upwardly through a range determined by the component dimensions.

Operating the drive 46, so as to effect shortening of the overall length of the extendable cylinder 34, causes the bracket 40 to pivot clockwise from the FIG. 1 position, whereupon the drive component 42 repositions within the guide tube 44 so that the upstream end of the main frame 18 is progressively lowered under its own weight to the FIG. 2 position.

As noted in the Background Art portion, this type of system is relatively expensive and complex in nature. The interaction of the drive component 42 with the guide tube 44, over time, may cause significant parts wear, as a result of which the mechanism may operate less effectively or, in a worst case, malfunction.

As further noted above, failure of any of the interacting components, namely the drive 46, extendable cylinder 34, drive component 42, etc., may disable the roll stand assembly 16 and thereby the entire apparatus 10.

Figure 4:
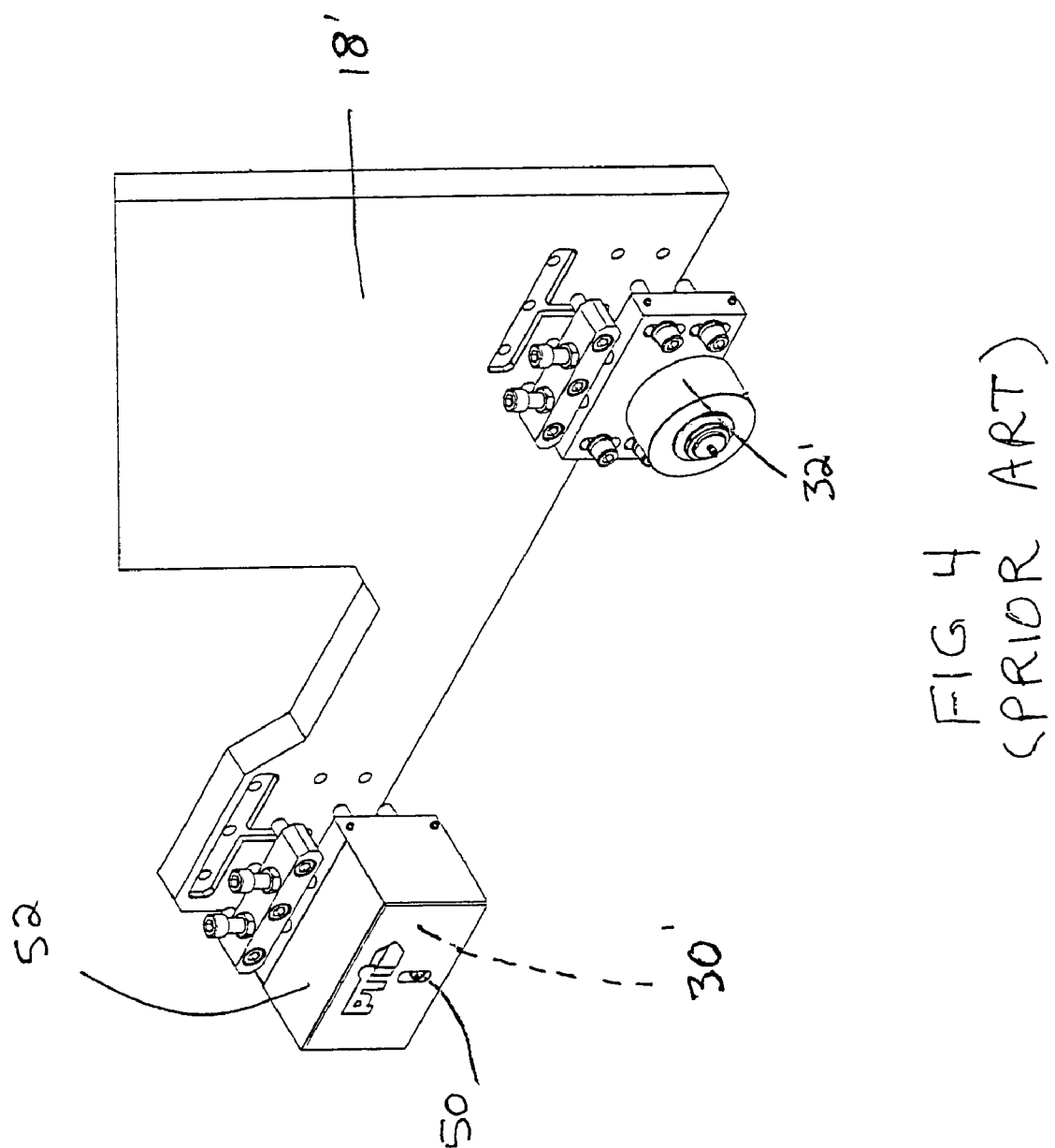
FIG. 4 is a fragmentary, perspective view of a portion of a conventional roll stand assembly including a pair of casters with one of the casters adjustable to selectively raise and lower the upstream end of the roll stand assembly.

In an alternative form of prior art mechanism, as shown in FIG. 4, corresponding casters 30', 32' are provided on a main frame 18'. The casters 30' at the upstream end of the main frame 18' are constructed so that they are vertically movable selectively relative to the main frame 18' to effect elevation and lowering thereof relative to a cooperating sheet die 14. This mechanism is operated through a movable adjusting component 50.

As noted in the Background Art portion, above, an operator will be required to go to opposite sides of the main frame 18' to progressively change the position of the adjusting components 50 to set the desired height. The adjusting components 50 are operated through a separate tool that is directed through a protective housing 52 over the caster 30' and its mounting components. A substantial repositioning force may have to be imparted through the tool to move the adjusting components 50.

As further noted above, excessive adjustment of the component 50 on one side of the main frame 18 may cause the main frame 18 to skew significantly before a compensating adjustment is made on the other side of the main frame 18.

As also noted above, the operator may have to make repeated coordinated movements of the components 50 on the opposite sides of the main frame 18 and eventually use a separate measuring tool to ascertain the set vertical position of the nip location 26. This process is potentially time consuming, inherently inconvenient, and potentially imprecise.

Referring now to FIGS. 5-21, an apparatus is shown at 60 for continuously forming an extruded sheet product, according to the present invention. The apparatus 60 consists of an extruder assembly 62 with a sheet die 64 through which a flowable material is delivered for sheet product formation to a nip/lamination location 66 between vertically adjacent rolls 68, 70 on a roll stand assembly 72.

The roll stand assembly 72 consists of a main frame 74 that supports the rolls 68, 70, and at least one additional roll 76, that cooperatively define a roll stack sub-assembly 78. The main frame 74 additionally supports a sheet take-off sub-assembly 80 in cantilever fashion from the downstream end of the main frame 74. The precise construction of the roll stand assembly 72 is not critical to the present invention. For purposes of the invention herein, the only critical components on the roll stand assembly are the rolls 68, 70 supported on the main frame 74 to define the nip/lamination location 66 at the upstream end of the roll stand assembly 72.

The roll stand assembly 72 is supported upon a sub-frame assembly 84 for movement in translation in a predetermined path, selectively towards and away from the extruder assembly 62, as indicated by the double-headed arrow 86.

The sub-frame assembly 84 consists of laterally spaced, elongate rails 88, 90 that have parallel lengths extending in the direction of the arrow 86. The rails 88, 90 cooperate with sliding shoes 92, 94, provided in pairs (one shown) at the bottom of laterally spaced side walls 96, 98, making up the main frame 74.

In operation, the roll stand assembly 72 is translated guidingly along the rails 88, 90 to place the sheet die 64 at the nip location 66 between the rolls 68, 70. Flowable material from the sheet die 64 is delivered over the axial extent of the rolls 68, 70 at this location and is formed into a sheet layer by the rolls 68, 70, which is eventually formed into a sheet product, that may consist of the one sheet layer, or the sheet layer that is combined with one or more additional sheet layers that are formed concurrently with or pre-formed and combined with the one sheet layer at the roll stand assembly 72.

Depending upon the nature and thickness of the flowable material, the relative vertical relationship between the sheet die 64 and nip location 66 is selectively varied. This is accomplished by incorporating a vertical height positioning mechanism, as shown at 100.

The vertical height positioning mechanism 100 consists of first and second, like lift components 102, 104 that cooperate with the main frame 74 at laterally spaced locations. More specifically, the exemplary lift component 102 is bolted within a complementarily-undercut receptacle 106 on the inside of the frame side wall 96. Through this arrangement, the fixed relationship between the lift component 102 and side wall 96 is stabilized by the cooperation between the peripheral edge 108 around the receptacle 106 and the complementarily-shaped outer periphery 110 of the lift component 102. The lift component 140 is fixed to the side wall 98 in like manner.

Figure 5:
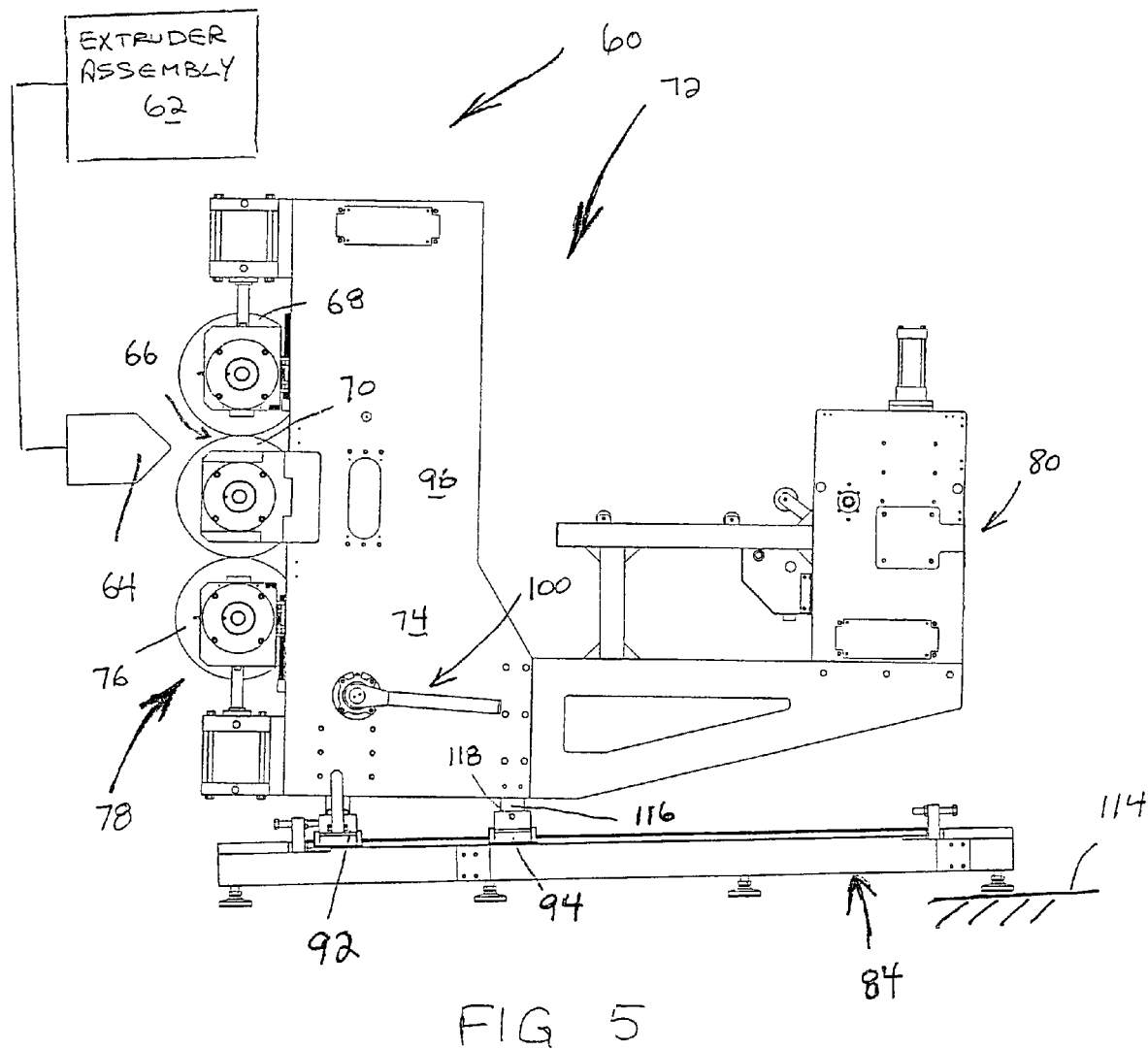
FIG. 5 is a side elevation view of an apparatus for continuously forming an extruded sheet product, according to the present invention, and including an extruder assembly with a sheet die that cooperates with a roll stand assembly with a main frame that is guided along a sub-frame and with a vertical height positioning mechanism for the upstream end of the roll stand assembly maintaining the upstream end of the roll stand assembly in a raised position.
Figure 6:
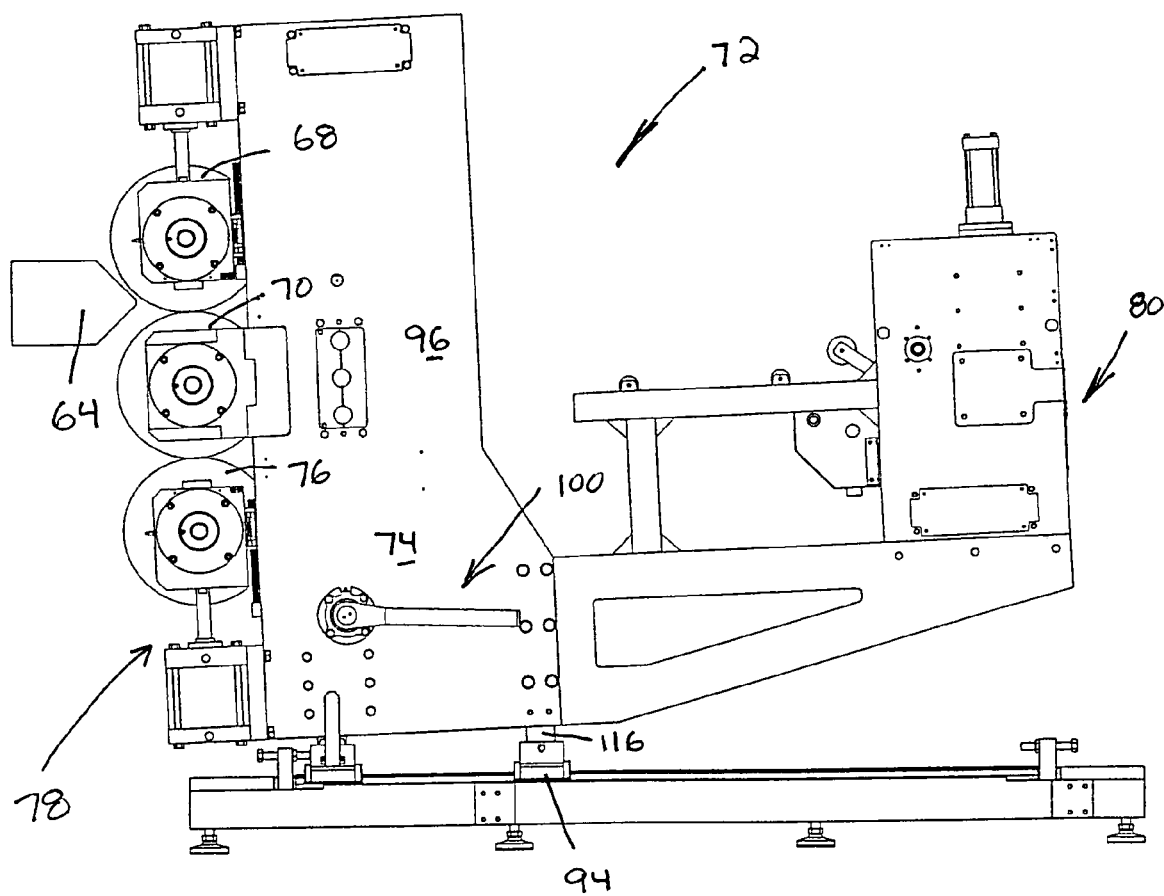
FIG. 6 is a view as in FIG. 5 wherein the upstream end of the roll stand assembly is in a lowered position.
Figure 7:
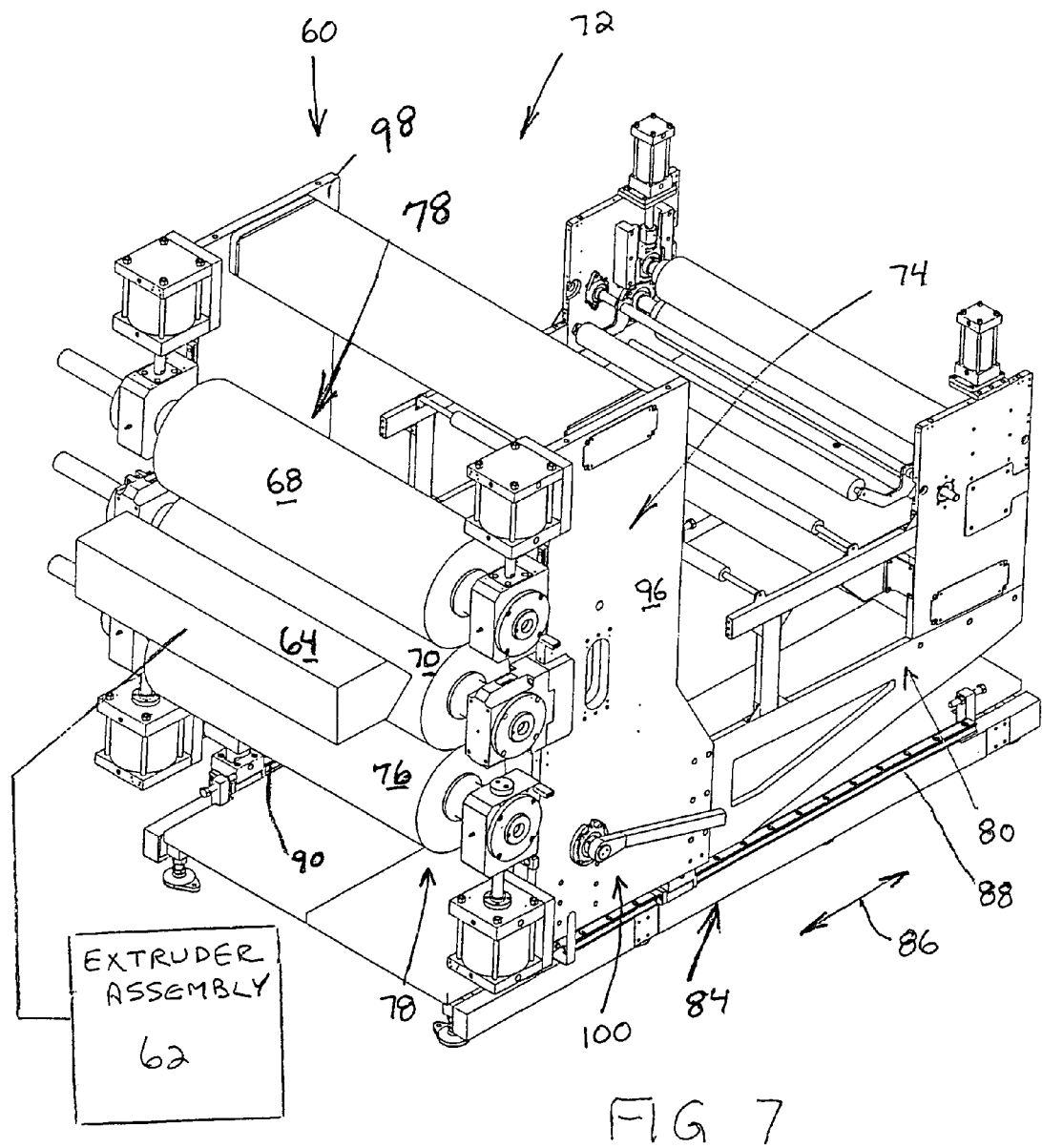
FIG. 7 is a perspective view of the apparatus in the FIG. 5 state.
Figure 8:
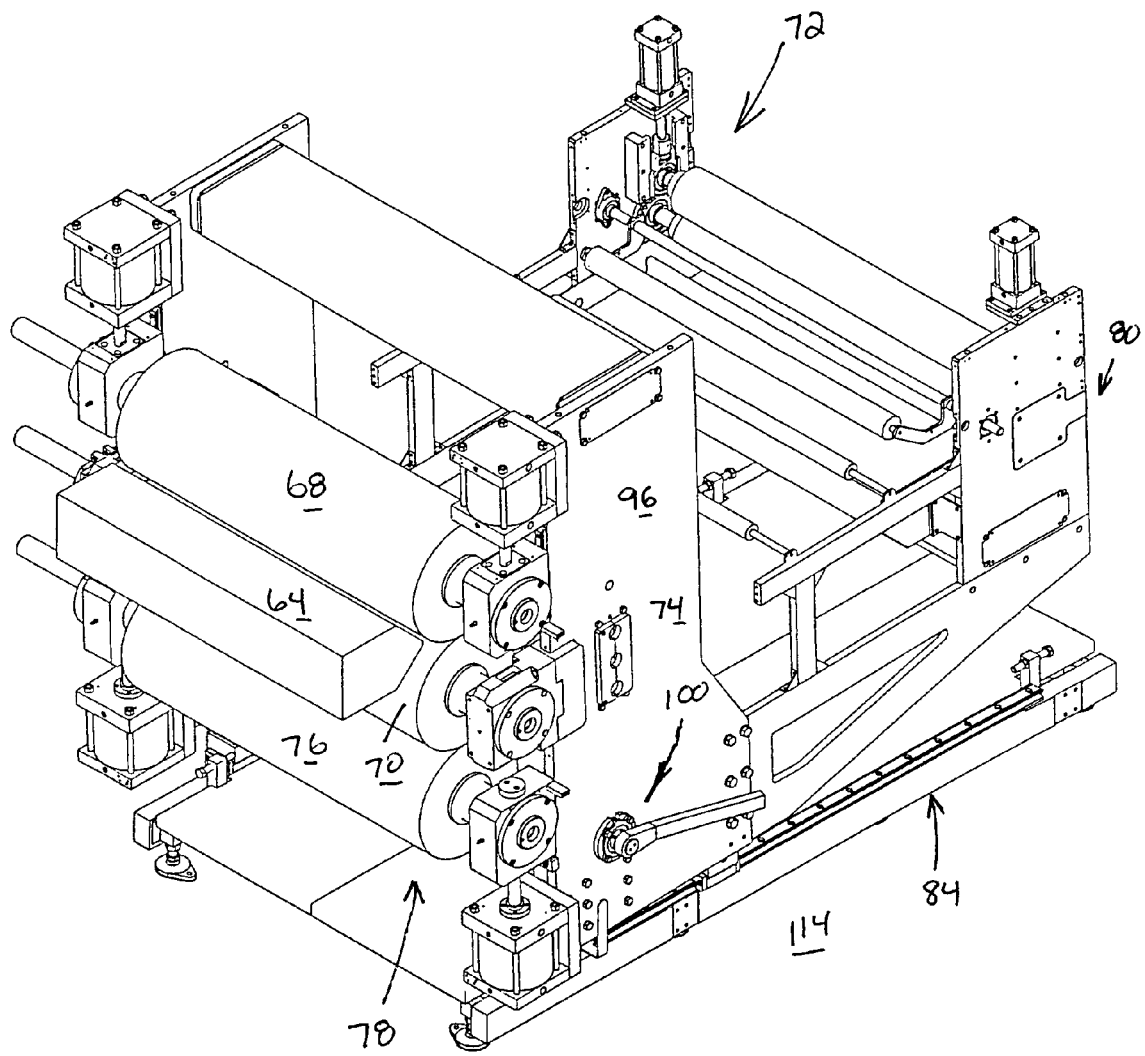
FIG. 8 is a perspective view of the apparatus in the FIG. 6 state.
Figure 9:
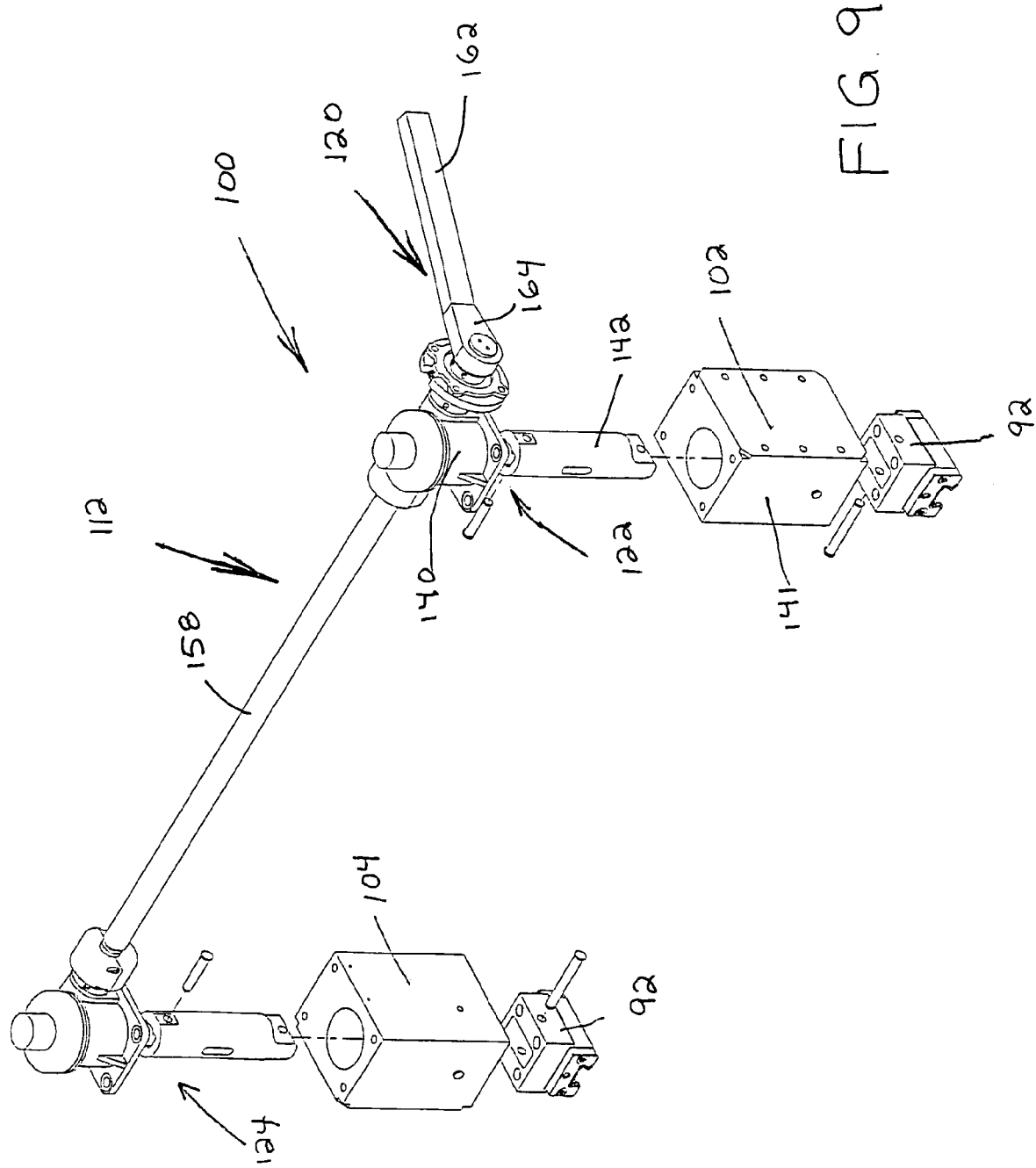
FIG. 9 is an enlarged, exploded, perspective view of the vertical height positioning mechanism on the apparatus in FIGS. 5-8.
Figure 12:
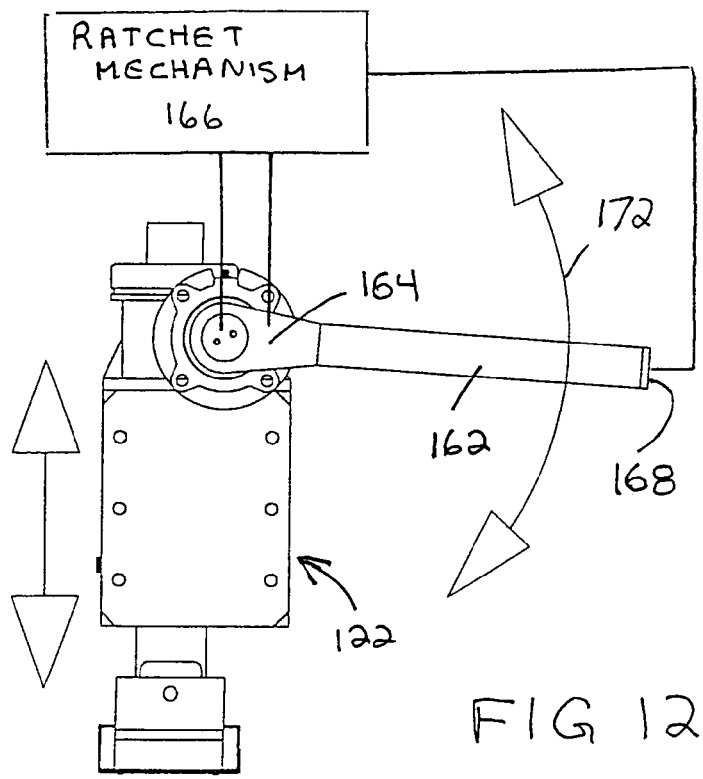
FIG. 12 is an enlarged, side elevation view of the vertical height positioning mechanism.
Figure 13:
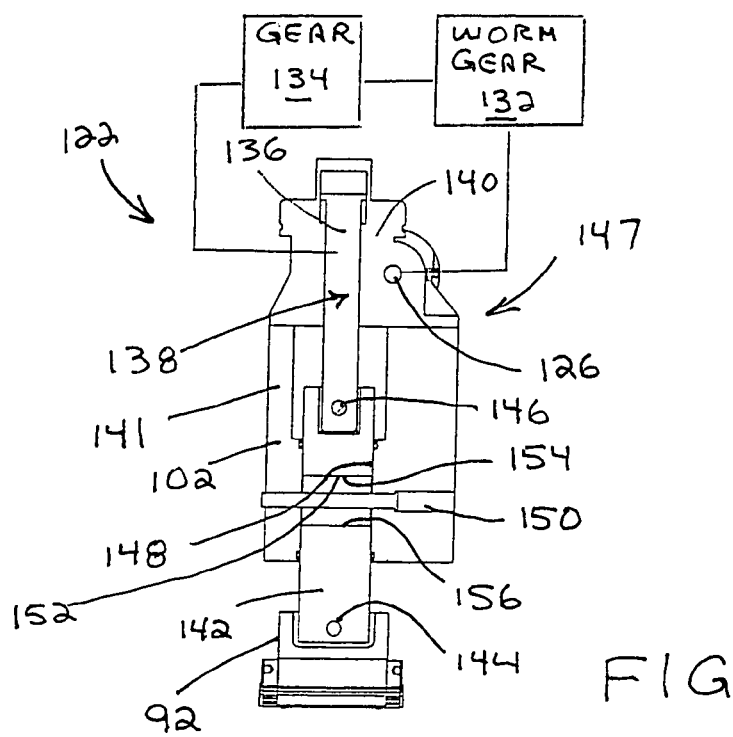
FIG. 13 is a cross-sectional view of an actuator sub-assembly on one side of the vertical height positioning mechanism taken along line 13-13 of FIG. 11.
Figure 14:
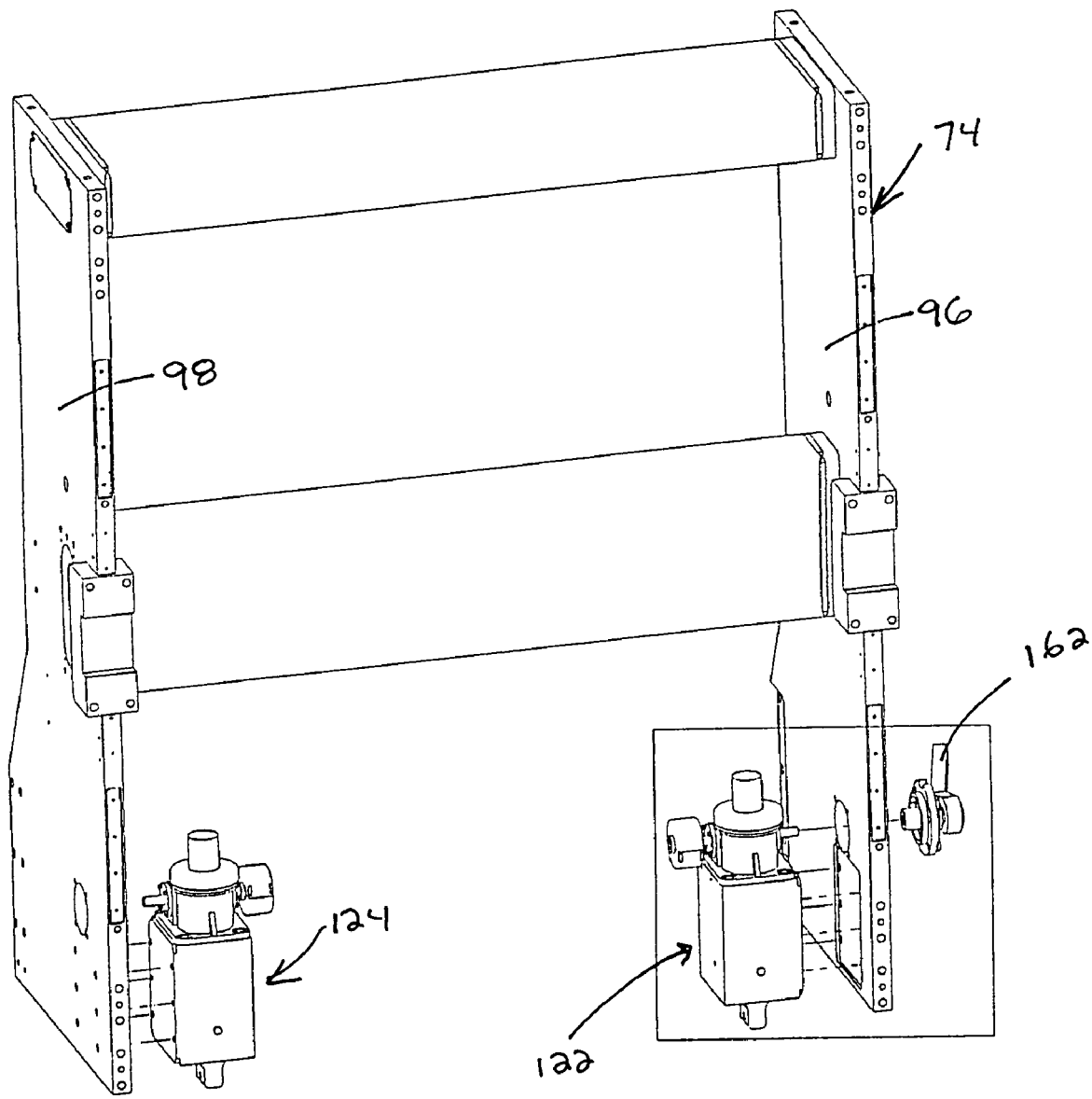
FIG. 14 is an exploded, perspective view of the main frame on the apparatus with the actuating sub-assemblies.
Figure 15:
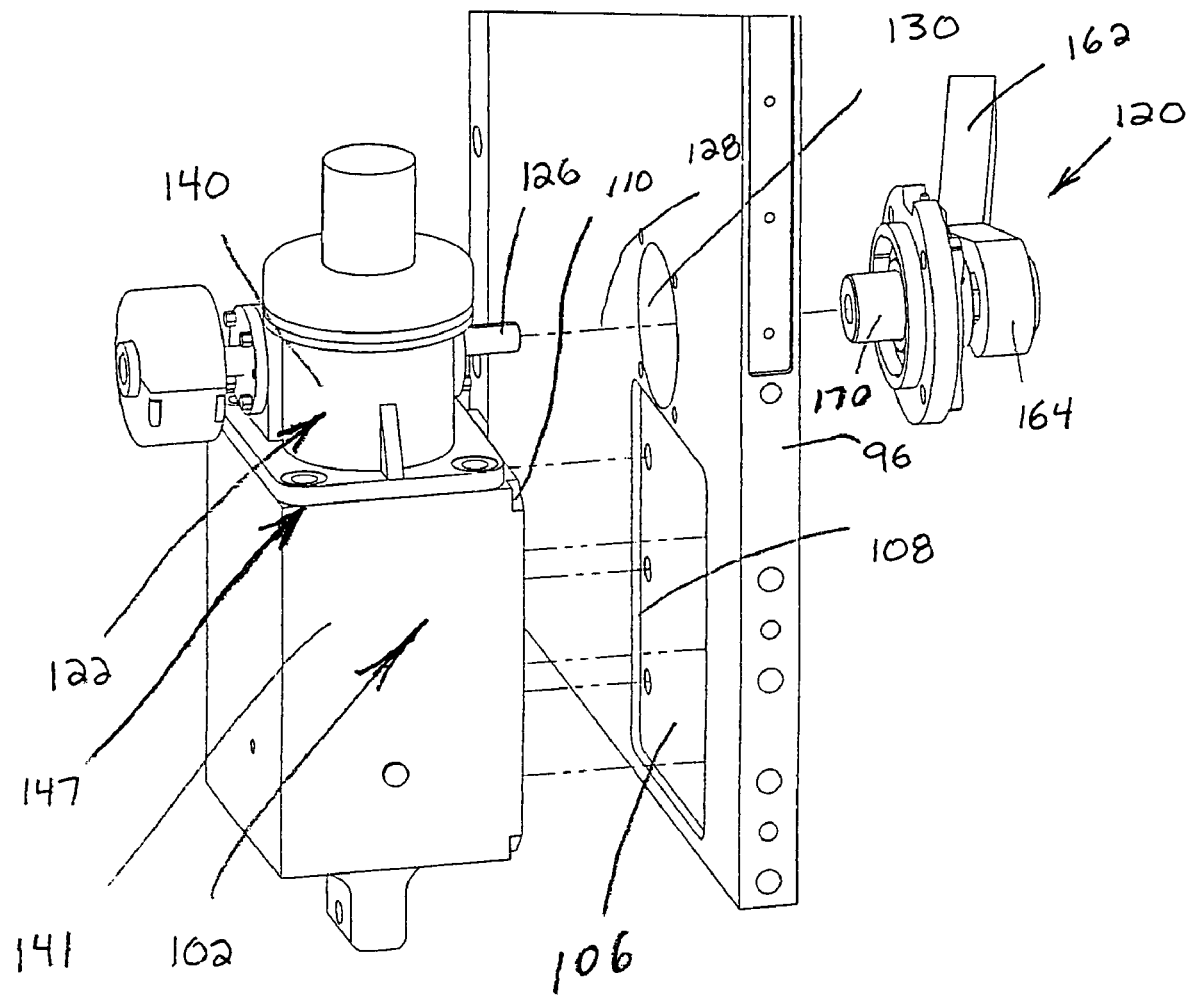
FIG. 15 is an enlarged, exploded, perspective view of one of the actuating sub-assemblies within the box in FIG. 14 in relationship to a main input actuator at the bottom of the main frame.

The vertical height positioning mechanism further includes an actuating system at 112 that is operable to selectively and simultaneously cause the first and second lift components 102, 104 to move: a) generally vertically upwardly in a first direction to raise the upstream end of the roll stand assembly 72, as shown in FIGS. 5 and 7; and b) generally downwardly to a lowered position, as shown in FIGS. 6 and 8, relative to a subjacent support surface 114 upon which the apparatus 60 bears, and thereby relative to the sheet die 64. That is, through the actuating system 112, forces are applied simultaneously to the lift components 102, 104 at the spaced frame side walls 96, 98. The forces are applied so that there is equal, simultaneous movement of the lift components 102, 104 as the upstream end of the main frame 74 is elevated and lowered.

While the movement of the upstream end of the main frame 74 is described as substantially vertical, it is in fact a movement that is slightly arcuate. This movement is facilitated by connecting depending supports 116 (one shown on the side wall 96 in FIG. 5) to the shoe 94 through a pivot pin 118 that extends horizontally and laterally through the support 116 and shoe 94 at each side wall 96, 98. Through this arrangement, the main frame 74 is allowed to pivot slightly around the axis defined by the pins 118.

The actuating system 112 further has a main input actuator 120 and first and second actuator sub-assemblies 122, 124, of like construction, respectively associated with the lift components 102, 104.

Exemplary actuating sub-assembly 122 consists of an input shaft 126 that is turned around an operating axis 128 that extends laterally and horizontally. An opening 130 is provided through the frame side wall 96 to permit engagement of the main input actuator 120 with the input shaft 126.

The precise mechanism for the actuating sub-assemblies 122, 124 is not critical to the present invention. In one preferred form, the input shaft 126 turns a worm gear 132 that is in turn in mesh with a gear 134 that vertically translates a vertically extending shaft component 136 on a shaft assembly 138 relative to a housing part 140, within which the gears 132, 134 are assembled, and which is fixedly secured to a main housing part 141 on the lift component 102. The shaft assembly 138 includes a second shaft component 142. The shaft component 142 has a bottom end connected to the shoe 92 through a horizontally and laterally extending pin 144. The shaft components 136, 142 are connected through a horizontally and laterally extending clevis pin 146.

Turning of the shaft 126 in one direction about its axis 128 causes a housing 147, defined cooperatively by the housing parts 140, 141 on the lift component 102, to shift downwardly relative to the shaft component 142, thereby causing the associated side wall 96 to shift downwardly. Opposite turning of the input shaft 126 causes a reverse movement of components that causes the side wall 96 to be lifted.

The movement of the lift component 102 is guided vertically along the length of the shaft component 142, that fits within a complementarily-shaped guide opening 148 in the housing part 141 on the lift component 102.

The range of vertical movement of the lift component 102 is limited by a pin 150 that passes through a slot 152 in the shaft component 142. Relative vertical movement of the lift component 102 and pin 150 is blocked by the housing part 141 as slot bounding surfaces 154, 156 thereon, respectively bounding the top and bottom of the slot 152, abut to the pin 150.

Through a linkage 158, an output end 160 of the input shaft 126 is connected to the input shaft 126' on the lift component 104 so that movement of the input shaft 126 effects a corresponding movement of the input shaft 126' to synchronize operation of the lift components 102, 104.

The main input actuator 120 has an elongate handle 162 and an operating head 164. The operating head 164 incorporates a ratchet mechanism 166 of conventional construction and which has different operating states that can be set by a knob 168 in conventional fashion.

The operating head 164 has an extension 170 that is keyed to the input shaft 126 through the side wall opening 130 so that the input shaft 126 follows movement of the extension 170 around the axis 128.

The handle 162 is grasped and repositioned in a predetermined manner around the operating axis 128, back and forth in opposite directions, as indicated by the double-headed arrow 172. With the main input actuator 120 in a first state, corresponding to a first state for the ratchet mechanism 166, back and forth movement causes the input shafts 126, 126' to turn in one direction that effects lifting of the upstream end of the main frame 74. In a second state for the main input actuator 120/ratchet mechanism 166, opposite, downward movement at the upstream end of the main frame 74 is effected through a corresponding movement of the first and second lift components 102, 104.

The handle 162 has an elongate portion that can be conveniently grasped by the hand of a user and moved in the predetermined manner by the user through that grasping hand.

The main input actuator 120, and the associated handle 162, preferably remain inseparably a part of the roll stand assembly 72, through the connection of the extension 170 and input shaft 126, so that these components are at all times available and accessible in their operating positions. For purposes of compact storage, the handle 162 can be aligned with its length extending in a direction generally between the upstream and downstream ends of the roll stand assembly 72.

Figure 16:
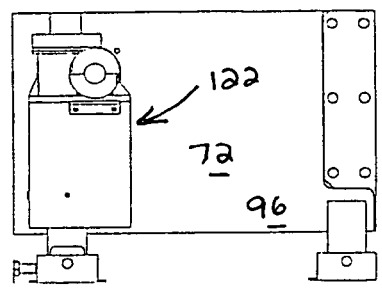
FIG. 16 is a schematic representation of the inventive main frame/roll stand assembly in a neutral position.
Figure 17:
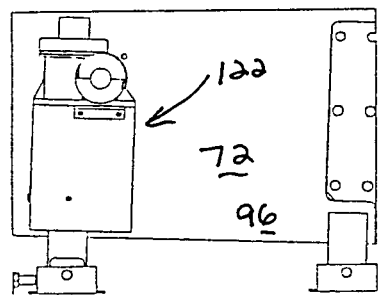
FIG. 17 is a view as in FIG. 16 with the upstream end of the main frame/roll stand assembly in a raised position.
Figure 18:
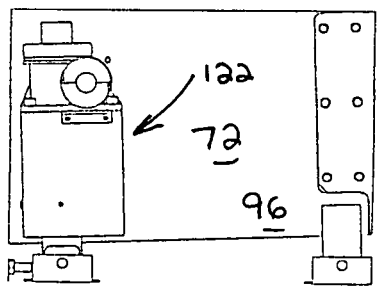
FIG. 18 is a view as in FIGS. 16 and 17 with the upstream end of the main frame/roll stand assembly in a lowered position.

In FIGS. 16-18, a schematic representation of the repositioning of the main frame 72 at the bottom of one side thereof is shown. In FIG. 16, a neutral position is depicted. In FIG. 17, the upstream end of the roll stand assembly 72 is fully raised, as permitted by the pivot connections of the various components cooperating between the main frame 74 and the shoes 92, 94. In FIG. 18, the upstream end of the roll stand assembly 72 is shown in its lowermost position.

Another aspect of the invention is the provision of an indicator assembly at 176 that provides a visually detectible indication of different orientations of the roll stand assembly as changed through the vertical height positioning mechanism 100.

Figure 19:
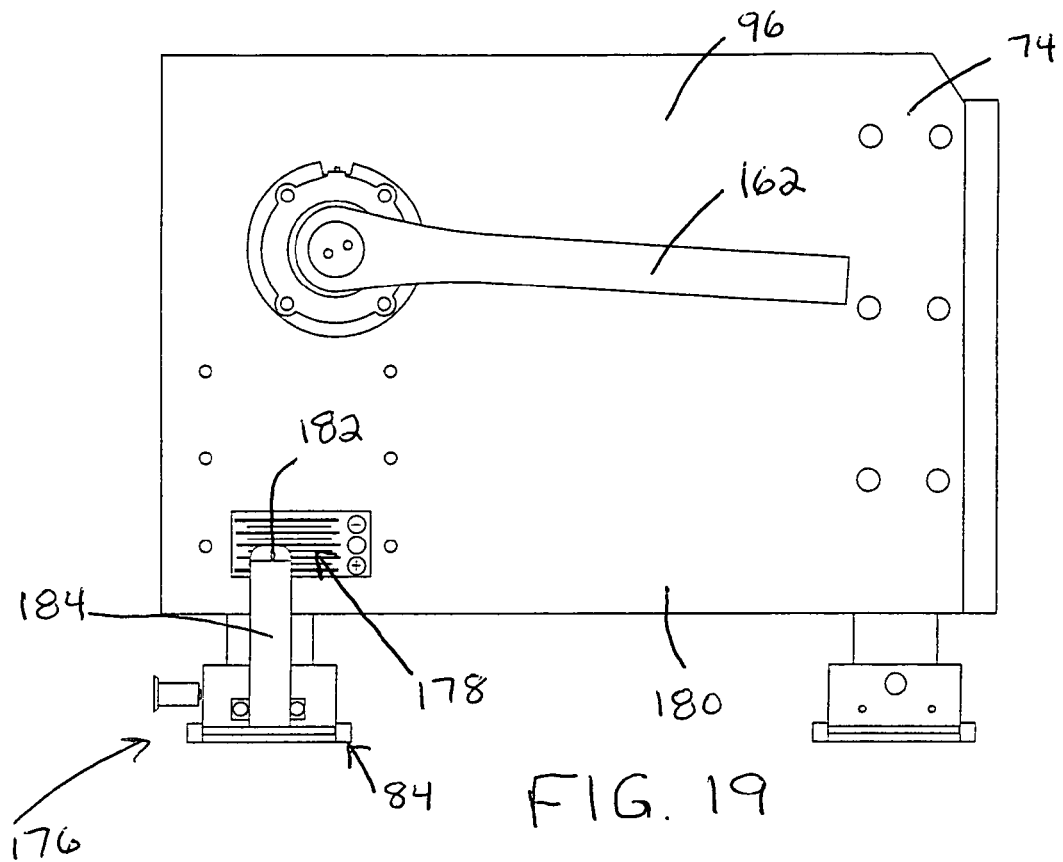
FIG. 19 is a fragmentary, side elevation view of a bottom portion of the main frame/roll stand assembly, with an indicator assembly incorporated therein and with the upstream end of the main frame/roll stand assembly in a neutral position.
Figure 20:
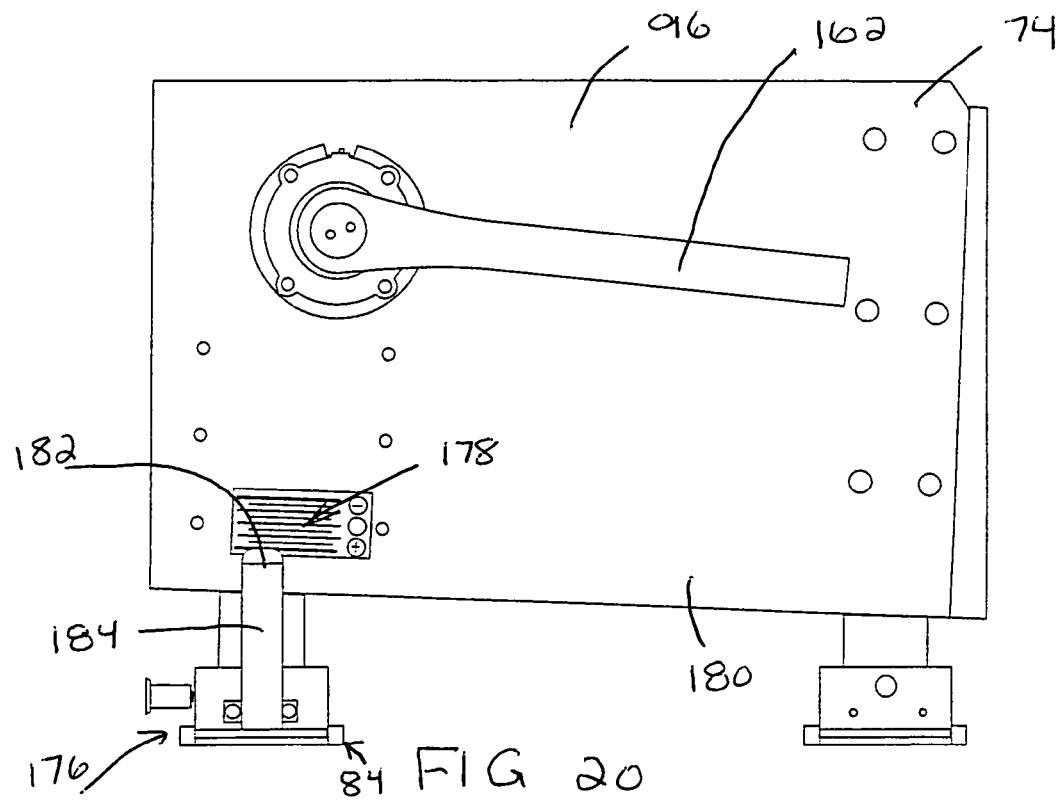
FIG. 20 is a view corresponding to that in FIG. 19 with the upstream end of the main frame/roll stand assembly in a raised position.
Figure 21:
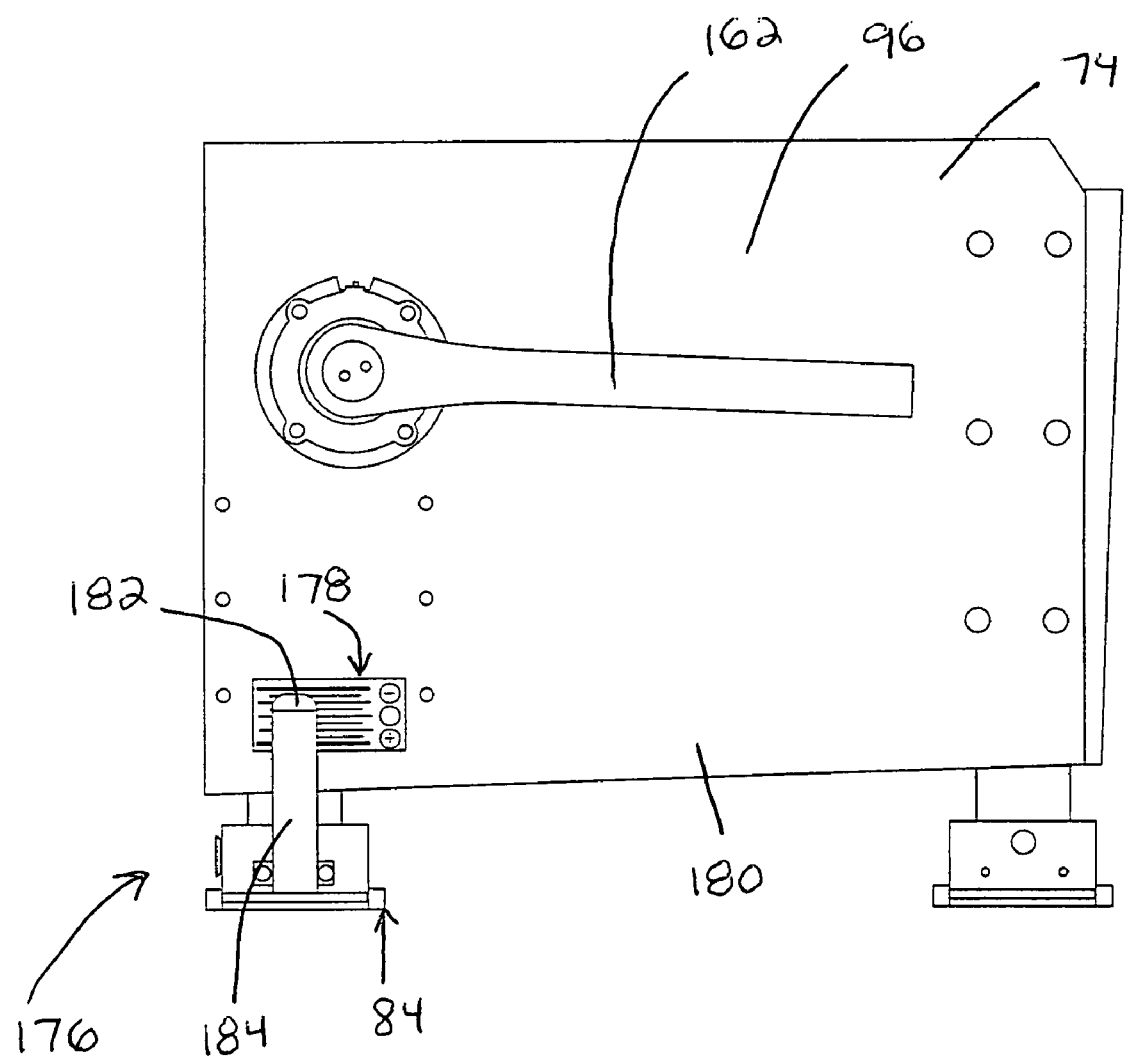
FIG. 21 is a view as in FIGS. 19 and 20 with the upstream end of the main frame/roll stand assembly in a lowered position.

More particularly, as shown in FIGS. 19-21, graduations 178 are provided on the exposed surface 180 on the side wall 96 of the main frame 74. A vertical reference line, or other form of indicia 182, is provided on a post 184 projecting vertically upwardly from the sub-frame assembly 84.

FIGS. 19-21 correspond successively with the positions shown in FIGS. 16-18 for the main frame 74 and roll stand assembly 72. In the neutral position of FIG. 20, the reference line 182 aligns with one of the graduations 178 that is identified with a quantified value representing a predetermined height for the nip location 66. The reference line 182 aligns with different graduations/indicia 178 with the upstream end of main frame 74/roll stand assembly 72 respectively raised and lowered in FIGS. 20 and 21. Accordingly, the operator can conveniently reposition the handle 162 and at the same time view the indicator assembly 176 and thereby determine precisely the height of the nip location 66.

The invention contemplates a number of variations from the preferred form described hereinabove. Whereas the lift components 102, 104 are shown fixed to the main frame 74, such a fixed connection is not required.

Further, different mechanisms could be provided to guide the upstream end of the main frame 74 and roll stand assembly 72 vertically relative to a subjacent support. For example, such movement may be effected by progressively camming the upstream end of the main frame 74/roll stand assembly 72 vertically as it is shifted in a substantially horizontal path.

The foregoing disclosure of specific embodiments is intended to be illustrative of the broad concepts comprehended by the invention.

The invention claimed is:

1. An apparatus for continuously forming an extruded sheet product, the apparatus comprising:
    an extruder assembly with a sheet die through which flowable material is delivered for sheet product formation;
    a roll stand assembly comprising a main frame and a plurality of rolls on the main frame that cause flowable material from the sheet die to be formed into a sheet layer that makes up a sheet product,
    the roll stand assembly having upstream and downstream ends and laterally spaced sides,
    the plurality of rolls comprising first and second rolls between which a nip location is defined at which flowable material is delivered by the sheet die; and
    a vertical height positioning mechanism through which a vertical relationship between the sheet die and nip location can be selectively varied,
    the vertical height positioning mechanism comprising first and second lift components that cooperate with the main frame at first and second laterally spaced locations,
    the first and second lift components each movable in first and second opposite paths relative to a subjacent support for the apparatus in: a) a first direction to thereby reposition the main frame in a first manner through force application at the first and second locations to thereby elevate the nip location relative to the sheet die; and b) a second direction to thereby cause the main frame to reposition in a second manner to thereby lower the nip location relative to the sheet die,
    the vertical height positioning mechanism further comprising an actuating system that is operable to selectively and simultaneously cause the first and second lift components to move in the first direction.

2. The apparatus for continuously forming an extruded sheet product according to claim 1 wherein the actuating system is operable to selectively and simultaneously cause the first and second lift components to move in the second direction.

3. The apparatus for continuously forming an extruded sheet product according to claim 1 wherein the first and second opposite paths for the first and second components are substantially vertical paths.

4. The apparatus for continuously forming an extruded sheet product according to claim 1 wherein the actuating system comprises first and second actuator sub-assemblies associated respectively with the first and second lift components and a main input actuator comprising a graspable handle that is repositionable in a predetermined manner to cause the actuator sub-assemblies to cause the first and second lift components to move.

5. The apparatus for continuously forming an extruded sheet product according to claim 4 wherein the graspable handle remains inseparably a part of the roll stand assembly.

6. The apparatus for continuously forming an extruded sheet product according to claim 4 wherein the graspable handle is movable in the predetermined manner around an operating axis.

7. The apparatus for continuously forming an extruded sheet product according to claim 6 wherein the main input actuator has first and second states and: a) with the main input actuator in the first state the graspable handle is movable back and forth in opposite directions around the operating axis to thereby cause the lift components to move in their first direction as an incident of which the main frame is repositioned to elevate the nip location relative to the sheet die; and b) with the main input actuator in the second state the graspable handle is movable back and forth in opposite directions around the operating axis to thereby cause the lift components to move in their second direction as an incident of which the main frame is repositioned so as to lower the nip location relative to the sheet die.

8. The apparatus for continuously forming an extruded sheet product according to claim 4 wherein the first and second actuator sub-assemblies are linked to each other to operate simultaneously.

9. The apparatus for continuously forming an extruded sheet product according to claim 8 wherein the first and second actuator sub-assemblies comprise first and second input shafts that are turned selectively oppositely around first and second axes and the first and second actuator sub-assemblies are linked so that movement of the first input shaft around the first axis causes a corresponding movement of the second shaft around the second axis.

10. The apparatus for continuously forming an extruded sheet product according to claim 4 wherein the apparatus further comprises a sub-frame assembly and the main frame has a plurality of shoes including first and second shoes that cooperate with the sub-frame assembly to allow the main frame to be guidingly moved relative to the extruder assembly and sheet die on the extruder assembly and the first and second actuator sub-assemblies are respectively mounted on the first and second shoes.

11. The apparatus for continuously forming an extruded sheet product according to claim 10 wherein the first and second actuator sub-assemblies are connected to the first and second shoes through first and second pins that allow limited pivoting movement respectively between the first and second actuator sub-assemblies and first and second shoes.

12. The apparatus for continuously forming an extruded sheet product according to claim 6 wherein the graspable handle has an elongate portion that can be grasped by a hand of a user and moved in the predetermined manner by the user through the grasping hand.

13. The apparatus for continuously forming an extruded sheet product according to claim 12 wherein the apparatus has upstream and downstream ends and the elongate handle portion has a length that is alignable to extend generally between the upstream and downstream ends of the apparatus.

14. The apparatus for continuously forming an extruded sheet product according to claim 6 wherein the operating axis extends substantially horizontally.

15. The apparatus for continuously forming an extruded sheet product according to claim 1 wherein the first and second lift components each comprises a housing that is fixed to the main frame and the first and second sub-assemblies comprise first and second vertically extending shaft assemblies relative to which the first and second housings are respectively guidingly moved in the first and second directions.

16. The apparatus for continuously forming an extruded sheet product according to claim 15 wherein the actuating system comprises first and second actuator sub-assemblies each comprises first and second gears that interact on each actuator sub-assembly and are turned relative to each other to effect guided movement of each housing relative to a respective shaft assembly.

17. The apparatus for continuously forming an extruded sheet product according to claim 15 wherein the main frame comprises laterally spaced side walls between which the plurality of rolls is mounted and the housings are fixed, one each to the main frame side walls.

18. The apparatus for continuously forming an extruded sheet product according to claim 1 wherein the apparatus further comprises an indicator assembly that provides a visually detectable indication of different orientations of the roll stand assembly as changed through the vertical height positioning mechanism.

\* \* \* \* \*